No. 669,279. Patented Mar. 5, 1901.
C. H. HARRINGTON.
METHOD OF SHAPING SHEET METAL BY HYDRAULIC PRESSURE.
(Application filed May 8, 1900.)

(No Model.)

Witnesses,
E. A. Brandau
J. F. Amse

Inventor,
Charles H. Harrington
By Dewey Strong & Co.

THE NORRIS PETERS CO., PHOTO-LITHO., WASHINGTON, D. C.

UNITED STATES PATENT OFFICE.

CHARLES H. HARRINGTON, OF SAN JOSÉ, CALIFORNIA, ASSIGNOR TO F. L. ARGALL AND W. C. ANDERSON, OF SAME PLACE.

METHOD OF SHAPING SHEET METAL BY HYDRAULIC PRESSURE.

SPECIFICATION forming part of Letters Patent No. 669,279, dated March 5, 1901.

Application filed May 8, 1900. Serial No. 15,900. (No model.)

*To all whom it may concern:*

Be it known that I, CHARLES H. HARRINGTON, a citizen of the United States, residing at San José, county of Santa Clara, State of California, have invented an Improvement in Methods of Shaping Sheet Metal by Hydraulic Pressure; and I hereby declare the following to be a full, clear, and exact description of the same.

The object of my invention is to form plastic, flexible, or ductile material into any desired form or shape by the compressive action of water confined and subjected to a heavy blow or pressure.

Figure 1:
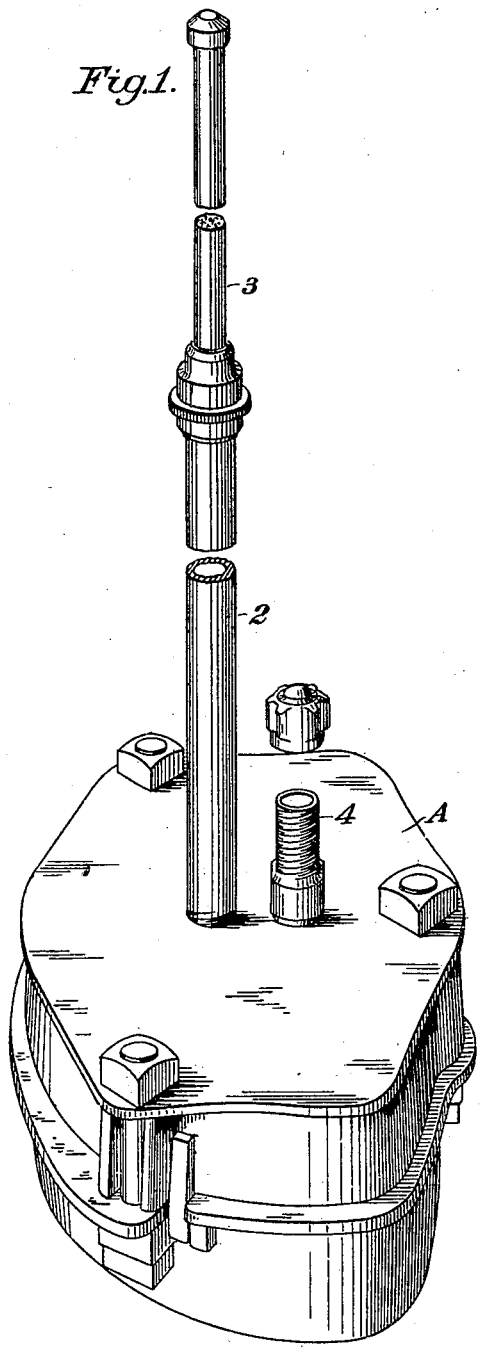
Figure 2:
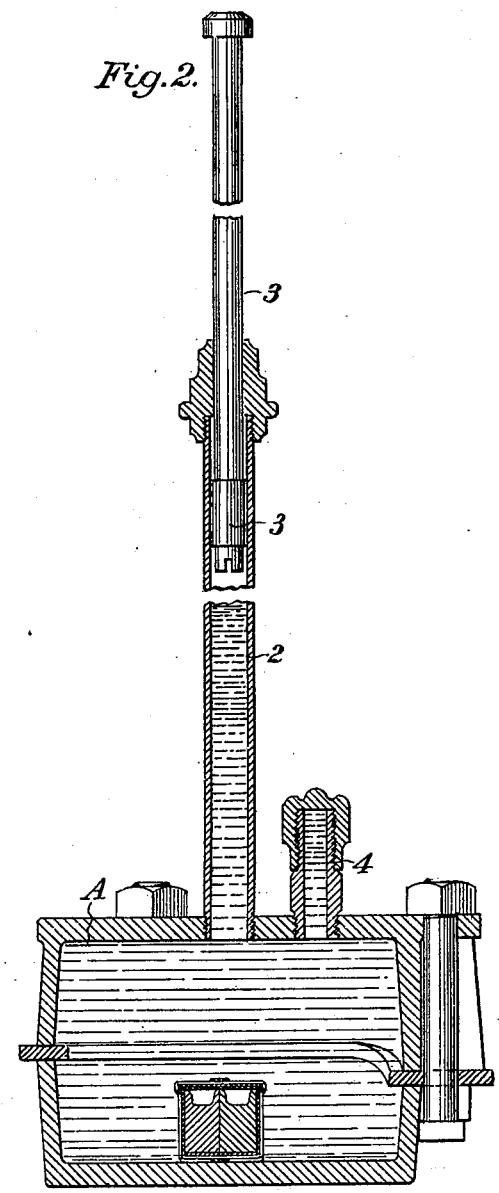
Figure 3:

Referring to the accompanying drawings for a more complete explanation of my invention, Figure 1 is a perspective view of an apparatus suitable for carrying out my method. Fig. 2 is a transverse section. Fig. 3 is a section of a mold, showing the formation of a tooth-crown.

My invention is designed to utilize the well-known inelastic and mobile quality of liquids under pressure to form ductile, tensile, or flexible material into any desired shape by means of molds, dies, or formers, in contact with which the material to be shaped is placed and afterward subjected to the heavy pressure of sudden impact transmitted through the body of water with which the parts are surrounded.

It will be understood that this method may be applied to the formation of any metal or equivalent ductile or plastic material which it is desired to shape, such as thin steel plates for the formation of steel ceilings, the formation of cans or other containing-bodies, or ornamental papier-mâché, paper, or other material.

I have here shown my invention as applied to the formation of small articles, such as tooth-crowns and the like, which sufficiently illustrate the general application of the invention.

A is a chamber made of any suitable material sufficiently strong and properly reinforced, if necessary. The chamber may be constructed in any way, so as to be readily opened for the introduction and removal of the parts with sufficient rapidity. In the present case I have shown the chamber as formed in two parts fitted together and secured by screw bolts and nuts and having a gasket to prevent leakage. Connected with this chamber is a pipe 2 of comparatively small diameter and having a plunger 3, fitting and moving fluid-tight within the tube. The end of this plunger is fitted in any suitable or desired manner to receive pressure or the impact of a blow.

The apparatus is filled with water, and air may be allowed to escape therefrom while it is being filled through any suitable escape-valve, as at 4.

The operation will then be as follows: The desired die, form, mold, or shape is produced in any well-known or usual manner, as by engraving, if it be a metal die, or by casting, as in the case of plaster-of-paris or other equivalent plastic material which will set or harden from either a heated or moistened condition. Upon this die is placed the material which is to be shaped. In the case of a tooth-crown, which I use as an illustration, the mold or form of the tooth is made by plaster-of-paris, which is preferably made in two parts, so that any undercut or irregularity of the tooth or other form can be preserved in the mold and the mold can be separated to remove it from the part around which it has been cast or formed. Having been thus removed, the two parts are put together, and if it be a tooth-crown which is to be formed of gold the thin sheet of gold is laid over the mold, die, or other form, and the whole is then inclosed in some elastic flexible fabric, such as rubber or an equivalent therefor, and secured to prevent the entrance of the water into the interior. The parts thus arranged are then put into the container A, which is filled with water, air being expelled, and the tube is also filled with water. The plunger being introduced and resting upon the surface of the water, a heavy pressure or the impact of a blow upon the plunger acting through the incompressible and mobile liquid will force the metal and its surrounding elastic envelop into the die or mold, thus producing a perfect shape of the latter.

It will be manifest that this method may be applied to the formation of anything which can be pressed or stamped out by ordinary dies, molds, and presses of any description.

I have here mentioned water as being the fluid; but it will be understood that oil, glycerin, or any fluid which is suitable for the purpose may be used without altering the character of the invention.

Having thus described my invention, what I claim as new, and desire to secure by Letters Patent, is—

1. The improvement in shaping ductile or plastic materials, consisting in inclosing the material in contact with the die or former in a flexible elastic envelop, submerging the article thus inclosed in a body of inclosed liquid and subjecting the liquid exterior to the envelop to high pressure.

2. The method of shaping plastic or ductile materials consisting in placing the material to be shaped in contact with the die, mold, or former, inclosing the same in an elastic, flexible envelop whereby the admission of liquid to the mold is prevented, submerging the inclosed material and die in the liquid inclosed in a retaining-case; and subjecting the liquid exterior to the envelop to impact or high pressure, whereby the substance to be shaped is forced into the mold or form.

In witness whereof I have hereunto set my hand.

CHARLES H. HARRINGTON.

Witnesses:
H. A. GABRIEL,
E. S. JOHNSTON.